United States Patent [19]

Dean

[11] Patent Number: 5,581,892
[45] Date of Patent: Dec. 10, 1996

[54] FILLETING AND SKINNING KNIFE

[76] Inventor: James A. Dean, 14240 SW. Canal Rd., Indiantown, Fla. 34956

[21] Appl. No.: 453,200

[22] Filed: May 30, 1995

[51] Int. Cl.$^6$ ...................................................... B26B 7/00
[52] U.S. Cl. ........................................... 30/277.4; 30/317
[58] Field of Search ................................... 30/277.4, 314, 30/294, 295, 296.1, 298, 317; 452/132, 133

[56] References Cited

U.S. PATENT DOCUMENTS

| | | | |
|---|---|---|---|
| 898,535 | 9/1908 | Volckmann | 30/309 |
| 2,261,322 | 11/1941 | Zabak | 30/314 |
| 2,880,507 | 4/1959 | Zander | 30/294 |
| 3,451,132 | 6/1969 | Mulkins | 30/317 |
| 3,672,002 | 6/1972 | Penamn | 452/132 |
| 4,593,466 | 6/1986 | O'Brien | 30/296.1 |
| 4,711,030 | 12/1987 | Ruston, Sr. | 30/277.4 |

*Primary Examiner*—Hwei-Siu Payer
*Attorney, Agent, or Firm*—John P. Halvonik

[57] ABSTRACT

A filleting and skinning knife comprising a handle adapted to be positioned in the hand of a user. The handle has a generally longitudinal axis, and includes a front section and a rear section. An offset member is connected to the handle, and extends downwardly and below the front section of the handle. The offset member has a generally longitudinal axis which has an angular relationship to the longitudinal axis of the handle. The forward portion of the blade has the cutting edge and extends forwardly from the offset member. The blade member has a generally longitudinal axis and the forward part of this blade tapers at an angle to the rear of the blade. The rear of the blade is generally within the plane formed by the offset portion and the handle. The handle of the knife may include an electrical motor and drive linkage mechanism. The filleting knife provides a knife that is easier, safer and produces a thicker fillet.

2 Claims, 3 Drawing Sheets

FILLETING AND SKINNING KNIFE

FIELD AND BACKGROUND OF THE INVENTION

The subject matter of the invention relates to filleting knives, and more particularly to a filleting and skinning knife for use in preparing fish, game, or fowl. Such filleting knives generally have a handle, an offset portion that extends downwardly from the handle and a blade portion that extends forwardly from the handle. The bottom edge of the blade has the cutting edge that does the actual cutting.

In the embodiment disclosed herein the forward tip of the blade is tapered at angle to the general line of the rear of the blade. Also the offset portion of the knife is at an angle to that of the handle so that when viewed from the front the offset portion angles away from a line that runs vertically through the handle.

It is thought that the use of such a knife design having two types of angled portions (offset portion and tapered blade) on a filleting knife will allow the user to cut the fillets in only one direction-away from the user. To produce fillets, the user moves the blade in two directions, primary direction away from the user and into the side of the fish against the backbone, there is secondary motion back and forth as the user works this knife along the backbone of the fish. This second direction is perpendicular to the line of the primary stroke. The user cannot cut himself because if the knife is rotated so that the cutting edge faces the user the blade will not cut because the blade will go up in the air away from the cutting surface and will not be in a position to produce cutting action. The action of rotating the knife in ones hand will cause the blade to lift up from the surface because of the angle of the offset portion.

To understand this, one can study a scissors, for example and see that there are different versions for right and left handed users. When seen in cross section, the cutting blade of such scissors is really at one side of the blade and the other side is rather flat. Hence, if a left handed person tries to use a right handed scissors the pressure of his thumb and forefinger on the blades will be opposite that of a right hand person and the blade will not cut because the flatter edge of the blade is trying to cut. Pressure for cutting can be applied only in one direction, that is, away from the user. Pressure in the opposite direction toward the user will not produce any cutting action. The same is true for the right or left handed blades of the invention.

The angle of the offset portion allows the user's hand to remain somewhat above the cutting surface as he holds the knife with the blade facing the fish that is laying sideways upon the cutting surface. It is thought that the angle of the offset portion also allows the user a better angle at which to cut the fillet and thicker cuts may be produced. The thicker cuts are produced by downward pressure on the blade in combination with slicing movement away from the user.

Traditionally, the hunting and fishing industries have produced a plethora of unique knives, skinning and processing implements. These include a great variety of devices, coming in numerous configurations, sizes, and designs. It is believed that there does not exist a filleting knife which makes the hand and arm manipulation of a user easier, and yet conforms to the bone structure of the fish, game or fowl, such that a user can easily, rapidly, and efficiently produce fillets. Nor are there known any knives that promote cutting only in a direction away from the user.

DESCRIPTION OF THE PRIOR ART

There are no filleting blades known to applicant having a handle, downward offset portion and a cutting blade with both a forward taper of the front tip of the cutting blade and a sidewise tilt of an offset portion connected at the rear of the blade.

It is believed that the filleting knife disclosed herein allows the hand and arm manipulations of the filleting process to be made easier. Such a filleting knife having a sidewise taper allows the knife to conform to the bone structure of the fish, game or fowl, so that a user can easily, rapidly, and efficiently produce fillets.

SUMMARY OF THE INVENTION

The filleting and skinning knife comprising a handle, offset member and blade. The knife may be electrically or manually driven. The handle is adapted to be positioned in the hand of the user. The handle has a generally longitudinal axis and includes a front section attached to the offset member. The rear section of the handle may include an electrical motor and drive linkage means.

The offset member is connected at the front of the handle and extends below the front section of the handle in a general plane that passes through the longitudinal axis of the handle which is seen to be about vertical when the knife is viewed from the front. The offset member has a generally longitudinal axis. The lower portion of the offset member is at angle to this generally vertical plane. The blade member is connected to the offset member and extends forwardly from it.

The blade member has a generally longitudinal axis that lies in a plane passing through the lower portion of the offset member. The front of this blade is tapered with respect to the general line of its longitudinal axis. This angular relationship of offset portion and the front of the blade provides a filleting and skinning knife that is easy to use.

It is an object of this invention to provide a filleting and skinning knife which that is easier to use in the cleaning of fish, game, or fowl by providing a steeper angle of the blade edge visa vis the fish, etc.

It is another object of this invention to provide a filleting and skinning knife which conforms to ease of hand and arm manipulation of a user, and yet is inherently adapted to the bone structure of the fish, game, or fowl to produce fillets.

It is another object of this invention to provide a filleting and skinning knife which allows for the easy, efficient, and rapid cleaning of game or fowl by providing the user with a bladed tool that he can grasp with the hand above the level of the table while still keeping the blade of the knife upon the fish.

It is another object of this invention to provide a filleting and skinning knife which is cost effective yet operationally efficient.

It is another object of this invention to provide a filleting and skinning knife which can be readily manufactured as a left hand or right hand implement.

It is another object of this invention to provide a filleting and skinning knife which provides an offset blade to protect a user's hand, fingers, and body parts from scrapes, cuts, and other injuries by forcing the user to cut away from his body when the fish is in front of him because any movement of the blade toward the body will not produce a cutting action.

It is another object of this invention to provide a filleting and skinning knife having a uniquely angled blade in relation to the handle which allows for the cutting of thicker fillets with normal use.

It is another object of this invention to provide a filleting and skinning knife, either manually operated or automatically driven, which facilitates the cleaning of fish, game, or fowl.

Other objectives of the invention will become apparent to those skilled in the art once the invention has been shown and described.

Mechanism is discussed in U.S. Pat. No. Des. 200,905 incorporated herein by reference and is included as part of the specification.

DESCRIPTION OF THE PREFERRED EMBODIMENT

Figure 1:
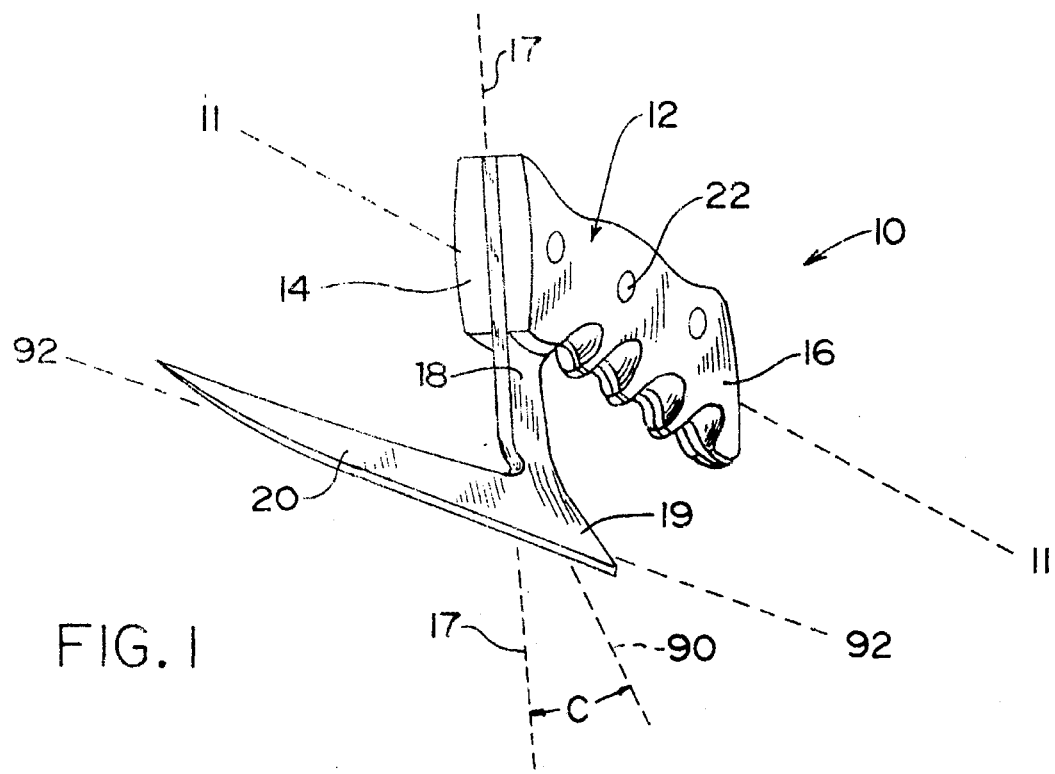
FIG. 1 a perspective view of manual version.

FIG. 1 shows a non-electrical filleting and skinning knife 10. The handle 12 is shown as including a front section 14 and rear section 16. FIG. 1 illustrates the generally longitudinal axis 11 of handle 12. The knife comprises a vertical drop and an offset portion 18, an angled portion 19 (may be considered the bottom of 18) and the blade 20 that extends forwardly from the offset portion. The bottom edge of the blade is sharpened for cutting.

The offset member 18 is shown as extending below the front section 14 of handle 12. The lower, angled portion is shown as 19. In the non-electrical embodiment shown in FIG. 1, offset member 18 is generally rectangular in shape and having a longitudinal axis 17 that runs at about a 90 degree angle (when viewed from the side as in FIG. 4) with the longitudinal axis 11 of handle 12.

Figures 3A, 3B:
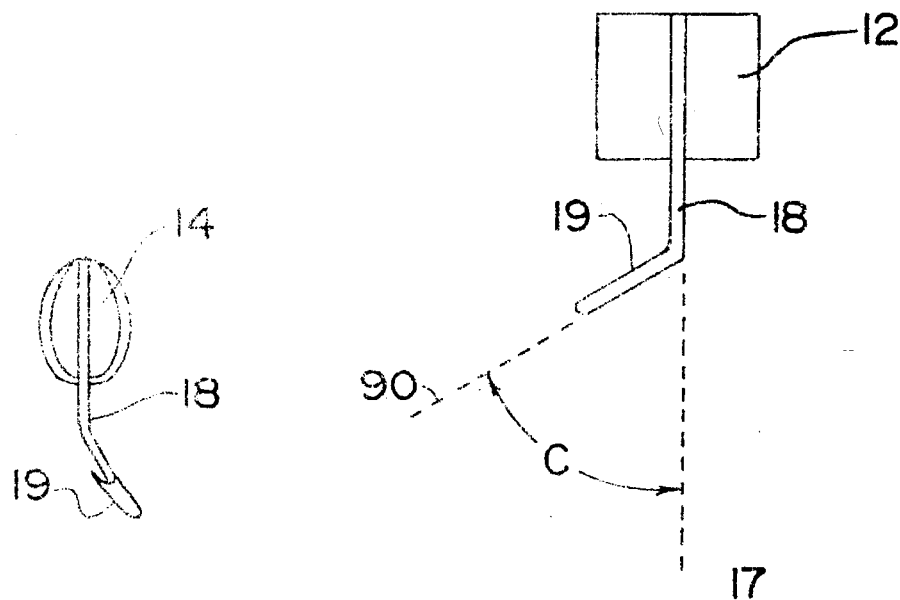
FIG. 3A a front view of a left handed embodiment of the invention (tip of knife closest to viewer), FIG. 3B a rear view of the left handed version, FIG. 4 a side view of an embodiment of the invention as illustrated in FIG. 2, FIG. 5 a side view of the electrical knife, FIG. 6 a front view of right hand version of electrical embodiment, FIG. 7 a block diagram of the reciprocating portions of the electrical knife.
Figure 4:
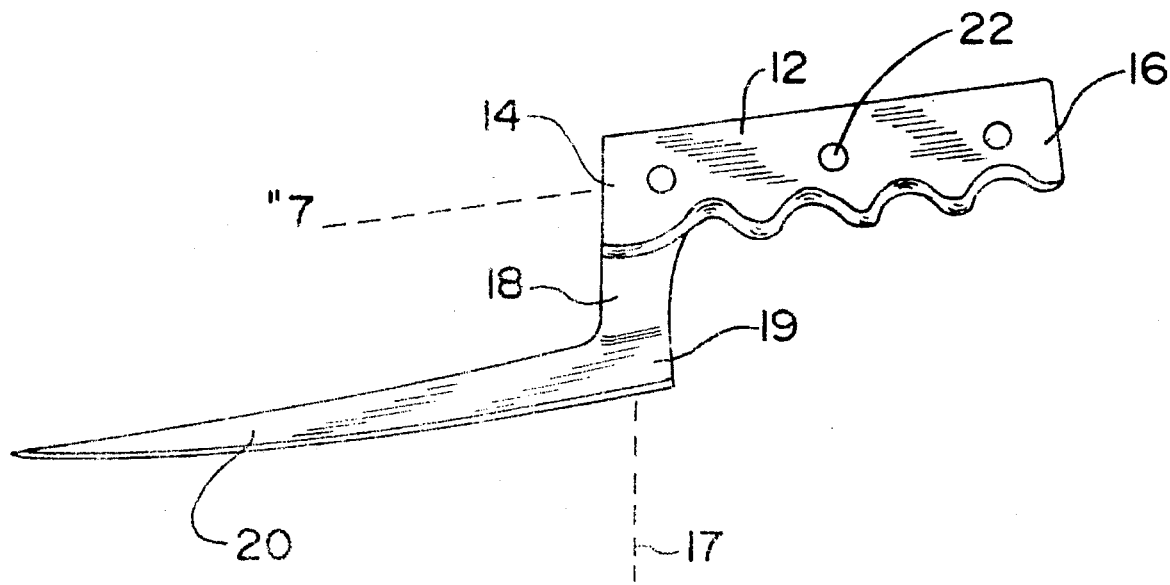

The offset member 18 lies generally in the plane formed by lines 11 and 17-the same plane that the handle lies in, see FIG. 4. This plane runs generally in a vertical direction as in FIG. 3B. The lower angled portion 19 is attached to the offset portion at an angle C away from the vertical. The lower portion 19 lies along the line 90. This is the offset angle as distinguished from the taper. The majority of the blade is in a plane defined by the line 90 and line 92. The line 92 lies along the axis of the main portion of the blade and this line is parallel to the line 11 of the handle, see FIG. 1. Thus lines 92 and 90 define a plane that is at an angle C to the plane of lines 11 and 17. The lower angled portion 19 and main portion of the blade 20 are thus at an angle C to the plane of the handle and portion 18 as shown in FIG. 1. The preferred offset angle C would be about 45°.

This offset angle will allow the user to hold the handle in the palm with the lower cutting edge of the blade in close proximity to the cutting surface. In this position, the cutting position, the user will have his hand with the knife at a distance above the cutting surface. This is due to the angle C. The fillet would lie side ways as the user views it and the secondary movement of the blade would be from the left to right along the back of the fish. Primary movement would be away from the user. Safety is therefore, inherent in the construction of the knife.

Figure 2:
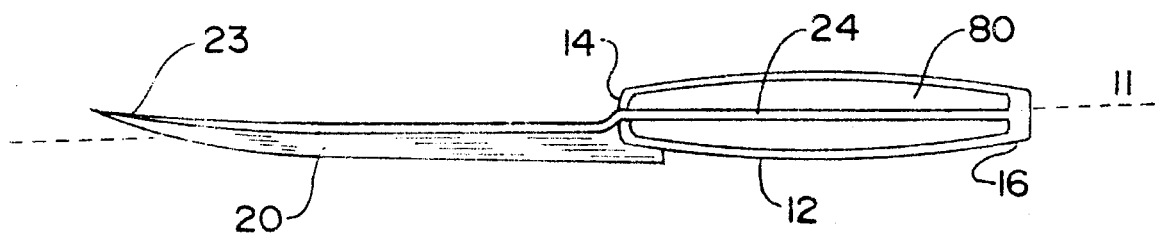
FIG. 2 a top view of left handed version illustrated in FIG. 1.

Blade member 20 is illustrated in FIGS. 1, 3A, and 3B and is connected to the offset member 18 through the back of the blade 19. The front portion 23 of the blade should taper to the right for a left handed version viewed from the top, see FIG. 2. This taper would be to the left for a right handed version when viewed from above. As illustrated, blade member 20 also has a generally longitudinal axis 92 which is parallel to line 11 shown in FIG. 2. The taper is away from this axis.

FIGS. 1 through 4 show a non-electrical embodiment of the invention. The offset member 18, Blade 20 and central member 24 can be manufactured as an integral unit. Rivets 22 may connect the handle portions 12 and 80 together to central member 24. In alternative embodiments, blade member 20 can be connected by any state of the art means to the offset member 18 or handle 12.

It will be readily recognized by those of ordinary skill in the art that offset member 18 could have an angular relationship with respect to the longitudinal axis of handle 12 and still be within the spirit of the present invention.

Blade member 20 and offset member 18 can be manufactured as an integral unit. In alternative embodiments, blade member 20 can be connected in any feasible manner to the offset member 18 or handle 12.

It will be readily recognized that the blade member 20 can include blades having various types of curvatures, shapes or cutting edges. The important consideration is that the blade should have a unique angular relationship with respect to the generally vertical plane of handle 12, as seen in FIGS. 1, 3A, and 3B. The angular relationship allows the user to fillet a fish easily by moving the knife blade along the backbone of the fish. The angle of the blade should produce thicker cuts of fish, meat etc. as the user is cutting at downward angle that is steeper than would be using a normal blade.

Handle 12 includes mounting means 22. Mounting means 22 is utilized to connect the offset means to the handle. In a particular embodiment, mounting means 22 is a pin and rivet assembly which includes the central member 24 that is connected to offset member 18. Central member 24 can be manufactured as an integral unit with offset member 18 if desired. Those of ordinary skill in the art will appreciate that any number of conventional methods can be utilized in manufacturing and assembling blade member 20, offset member 18, and handle 12.

It is important to note that the angular relationship between blade member 20 and handle 12 or blade members 70 and 72 and handle 50 facilitates the process of skinning and filleting fish, game, meat or fowl. The user would generally position the handle within the palm of the left hand with the blade at angle C (offset angle) and near the cutting surface. The right hand version would have the angle in the opposite direction in FIG. 3B.

The blade may be driven either manually or electrically. The offset angle C should be at an approximately 45 degree angle with a plane passing through handle 12 or 50 and the upper blade portions 60 and 58 (in the electric version). Thus, by holding the handle the filleting operation would naturally take place and the blade member would inherently conform to the bone structure of the fish, game, or fowl. This allows ease in the filleting or cleaning process.

The unique offset member and the taper of the front of the blade in the non-electrical device allows a user to place his thumb on the top of blade member 20 and easily guide the knife during the filleting or cleaning operation. In this manner one can control the depth or angle of cut, and all fingers and knuckles, including the thumb, are protected from cuts, scrapes or other injuries because they are an upraised level above the surface where the cutting is taking place.

The user would have the fish laying in front of him in a side ways position (from the left to right as seen by the user). The angle C of the offset portion allows the user's right hand to remain somewhat above the cutting surface as he holds the knife with the blade against the fish. The fish is laying on the cutting surface. The rightward taper of the blade tip (in the left hand version) promotes a left to right cutting stroke when pushed away from the user and does not allow the blade to cut on the return action as it moves from right to left. The same is true for the right handed version. This makes for safer cutting, cleaning and filleting operations.

The user's hand is in an elevated position from the cutting blade because of the angle C formed by the blade with the plane of the handle. This allows the user to apply greater downward pressure and allows for easier cutting and a thicker fillet. The cutting edge of the blade would be slightly in front of the user's hand.

It is apparent that the present invention can be readily manufactured for use as a right handed or left handed implement. The only difference in the device is whether the blade member forms a right hand angle, or a left hand angle. It will also be appreciated that the angular relationship between blade member and offset member and handle, can be varied to provide a greater or smaller angle. It is thought reasonable for angle C to be between 30 to 60 degrees with 45° preferred angle.

Figure 5:
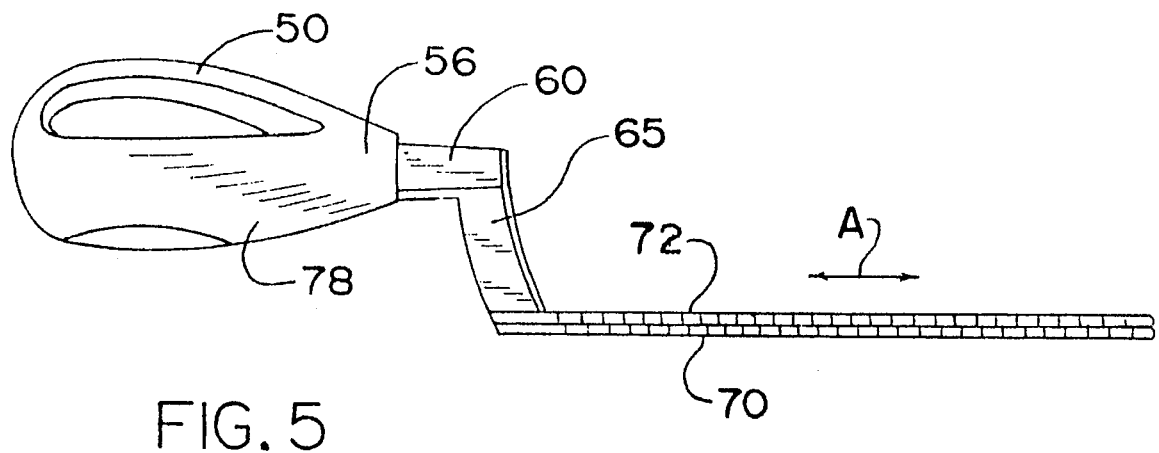
Figure 6:
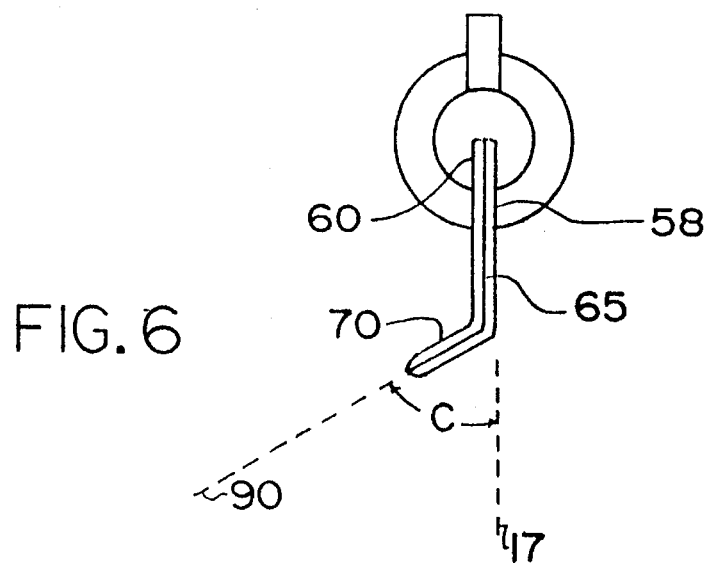
Figure 7:
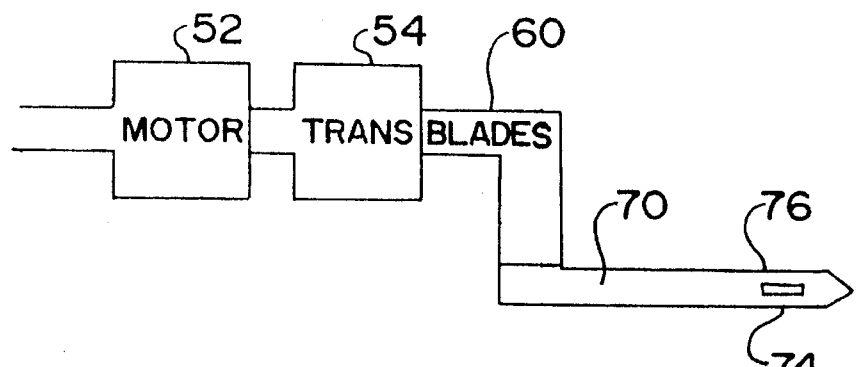

The electrical filleting knife is shown in FIGS. 5 and 6. The electric version has the offset angle but preferably the taper would be omitted. The handle 78 has an electrical motor 52 connected to a linkage mechanism that converts rotary motion to reciprocating motion by any state of the art means. The handle 78 has a front section 56 connected around the two upper blade portions 58 and 60. These portions 58 and 60 are driven by the transmission 54 and that, in turn, moves the cutting portions 70 and 72 of the blades.

The driven members operate in opposite directions as shown by arrow A. Upper blade member 58 moves in one direction parallel to the longitudinal axis of the handle and member 60 moves in a direction opposite that direction at the same time. Both members move back and forth as shown by arrow A through the action of the transmission 54.

There are two offset members shown as 65 in FIG. 5 and 6 and are analogous to the offset member 18 shown in FIG. 1. The two cutting blades 70 and 72 are positioned at a 45 degree angle to the plane of the upper blades 58 and 60 and the offset members 65. The lower portions of the offset members are in the same plane as the blades 70 and 72.

The blade members are interconnected by opening 74 and wide headed pin 76 adjacent to the end of the blades. The opening 74 is in blade 72 and the pin is connected to blade 70. The wide head of pin 76 is larger than the opening 74 and rides on the outer face of blade 70. The opening and pin arrangement allows the blades to reciprocate in opposite directions to provide an electrically driven blade sawing operation.

Handle 78 in the electric version may be constructed in two parts joined by screws in order to mount the interior parts motor 52 and transmission 54 and secure those portions 58 and 60 of the blades. In the manual version shown in FIG. 1, mounting means 22 is a pin and rivet assembly which connects to the central portion 24 of the handle. The center portion 24 can be manufactured as an integral unit.

In the FIG. 5, electrical version, the mounting means may be nothing more than a plurality of screws for mounting the internal mechanism. Those of ordinary skill in the art will appreciate that any number of conventional interconnecting methods can be utilized in manufacturing and assembling the cutting portions of the blades 70 and 72, as well as the offset member 65 and rear portions of the blades (58 and 60) to the handle. The electrical embodiment allows the same control as the mechanical version. Also, it reduces the amount of pressure needed to sever the meat from the skin and bones.

In both embodiments the cutting blade(s) may be at an angle C to the offset portion as shown in FIG. 3B and FIG. 6.

Any given state of the art materials may be used to manufacture the elements and sub-elements of the invention. While there have been described above the principles of this invention in connection with specific apparatus, it is to be clearly understood that this description is made only by way of example and not as a limitation to the scope of the invention.

I claim:

1. A filleting knife for filleting fish, game, or fowl, comprising: a handle, said handle adapted to be positioned within the hand, said handle having a top and a bottom, and as longitudinal axis, said handle having a front section and a rear section; an offset member connected to said handle at a right angle, said offset member extending below said front section of said handle; said offset member and said handle defining a first plane, said offset member having a lower portion; a blade portion extending from said lower portion and having a blade axis running about parallel to said axis of said handle, said blade portion and said lower portion defining a second plane that is at an angle to said first plane, said blade portion having a forward tip extending from said blade portion and tapered at angle to said blade axis, said blade portion having a top edge and a sharpened lower edge; wherein said second plane is at an angle of about 45° to said first plane.

2. The knife apparatus of claim 1 wherein said handle further comprises a mounting means for mounting a means for providing reciprocating motion to said blade portion.

* * * * *